(12) United States Patent
Geier et al.

(10) Patent No.: US 6,535,801 B1
(45) Date of Patent: Mar. 18, 2003

(54) METHOD AND APPARATUS FOR ACCURATELY DETERMINING THE POSITION OF SATELLITES IN GEOSYNCHRONOUS ORBITS

(75) Inventors: George Jeffrey Geier, Scottsdale, AZ (US); Roger Charles Hart, Gilbert, AZ (US); Thomas Michael King, Tempe, AZ (US)

(73) Assignee: General Dynamics Decision Systems, Inc., Scottsdale, AZ (US)

( * ) Notice: Subject to any disclaimer, the term of this patent is extended or adjusted under 35 U.S.C. 154(b) by 0 days.

(21) Appl. No.: 09/493,825

(22) Filed: Jan. 28, 2000

(51) Int. Cl.$^7$ .......................... H04B 7/185; G06F 15/48
(52) U.S. Cl. ...................... 701/13; 455/13.1; 342/361; 342/363
(58) Field of Search ........................... 701/13; 455/13.1, 455/13.3, 12.1; 342/361, 363, 368, 81, 355, 357.02, 352, 357.16

(56) References Cited

U.S. PATENT DOCUMENTS

| | | | | |
|---|---|---|---|---|
| 5,025,493 A | * | 6/1991 | Cook, Jr. ..................... | 342/374 |
| 5,041,833 A | * | 8/1991 | Weinberg .................... | 342/357 |
| 5,070,338 A | * | 12/1991 | Cohen ......................... | 342/355 |
| 5,584,047 A | * | 12/1996 | Tuck ........................... | 455/13.1 |
| 5,621,415 A | * | 4/1997 | Tuck ........................... | 342/354 |
| 5,717,404 A | * | 2/1998 | Malla .......................... | 342/357 |
| 5,765,098 A | * | 6/1998 | Bella .......................... | 455/13.3 |
| 5,906,337 A | * | 5/1999 | William et al. ............. | 244/158 |
| 6,018,316 A | * | 1/2000 | Rudish et al. .............. | 342/361 |
| 6,128,286 A | * | 10/2000 | Leopold et al. ............. | 370/316 |

OTHER PUBLICATIONS

An article entitled "Onboard Stationkeeping of Geosynchronous Satellites Using A Global Positioning System Receiver", by C.C. Chao and H. Bernstein from the Journal of Guidance, Control, and Dynamics, Jul.–Aug. 1994.

\* cited by examiner

*Primary Examiner*—Tan Q. Nguyen
*Assistant Examiner*—Dalena Tran
(74) *Attorney, Agent, or Firm*—Jenner & Block, LLC

(57) ABSTRACT

A method of determining the position of a satellite in a near geosynchronous orbit includes receiving at least one main lobe signal from an antenna on a first GPS satellite. A GPS signal, including GPS time and Doppler, is received from a pseudolite positioned on the Earth and an approximate position of each of a plurality of second GPS satellites is determined from an onboard almanac. Side lobe signals and accompanying noise are received from antennas on the plurality of second GPS satellites. The GPS signal and known sequential data bits are used for sorting or integrating the side lobe signals from the accompanying noise and the position of the satellite in a near geosynchronous orbit is determined using the one or more main lobe signals and the sorted side lobe signals.

13 Claims, 3 Drawing Sheets

METHOD AND APPARATUS FOR ACCURATELY DETERMINING THE POSITION OF SATELLITES IN GEOSYNCHRONOUS ORBITS

FIELD OF THE INVENTION

This invention relates to a method and apparatus for determining the position of satellites in or near geosynchronous orbits and more particularly, to improving GPS satellite coverage at geosynchronous altitude.

BACKGROUND OF THE INVENTION

At the present time, many space missions use, or attempt to use, the Global Positioning System (GPS) for accurately determining the position of geosynchronous satellites or other satellites at or near geosynchronous orbits. For low orbit satellites, instant position determination can be achieved because a relatively large number of GPS satellites (up to a maximum of 12, and always more than 4) are visible at any time. Since the orbit of these satellites is below the orbits of the GPS satellites and the GPS constellation is designed for near-earth use, the coverage is excellent. The major problem that arises for satellites in a geosynchronous orbit (which is above the orbits of the GPS satellites) is that one (or less) GPS satellites are normally visible and never more than a maximum number of three GPS satellites are visible. For a more thorough discussion of the problem, refer to an article by C. C. Chao and H. Bernstein entitled "Onboard Stationkeeping of Geosynchronous Satellites Using a Global Positioning System Receiver", *Journal of Guidance, Control, and Dynamics*, Vol. 17, No. 4, August 1994. Thus, at present the use of GPS for positioning of satellites in or near a geosynchronous orbit is tenuous at best.

Accordingly it is highly desirable to provide a method and apparatus for determining the position of satellites at or near geosynchronous orbits using GPS satellites.

BRIEF DESCRIPTION OF THE DRAWINGS

Referring to the drawings.

DESCRIPTION OF THE PREFERRED EMBODIMENTS

Figure 1:
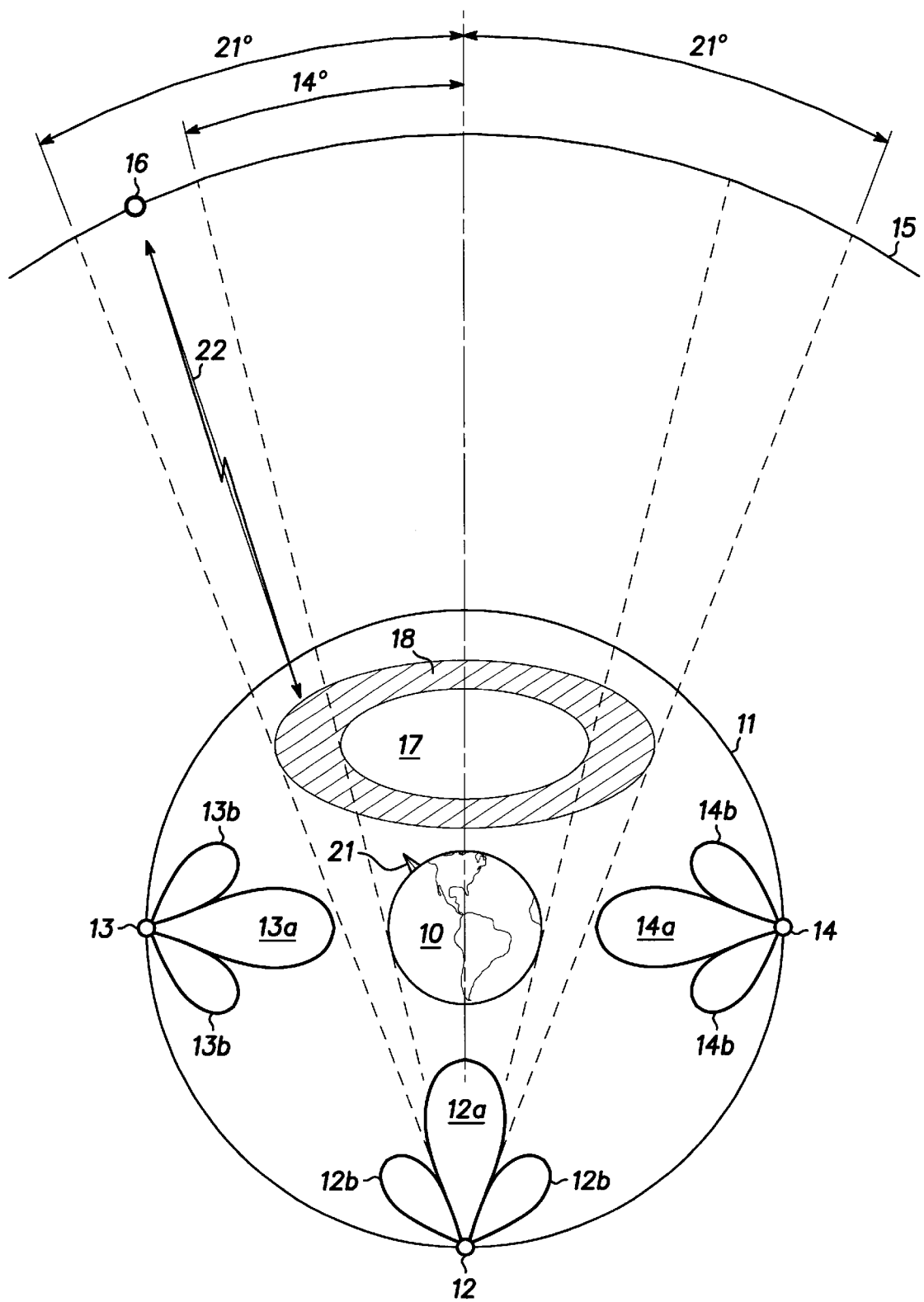
FIG. 1 is a simplified diagram illustrating the relative positions of the Earth and GPS satellites to satellites at or near geosynchronous orbits.

Turning now to FIG. 1, a simplified diagram illustrating the relative positions of the Earth, designated 10, and Global Positioning System (GPS) satellites, designated 12, 13, and 14, to a satellite at or near geosynchronous orbit 16 is illustrated. It will be understood by those skilled in the art that while the diagram illustrated in FIG. 1 is necessarily two dimensional, the various orbits actually lie in a spherical shell. Thus, a representative GPS orbit 11 is illustrated as a circle around Earth 10 but in fact the GPS satellites lie within a sphere around Earth 10. As is known, GPS orbit 11 is approximately three Earth radii in altitude above Earth 10. For purposes of this disclosure, the instantaneous position of three GPS satellites 12, 13, and 14 are illustrated in GPS orbit (or shell) 11. Also, a geosynchronous orbit (or shell) 15 is illustrated which, as is known, has an altitude above the Earth approximately twice the altitude of GPS orbit 11. For purposes of this disclosure, the instantaneous position of a geosynchronous satellite 16 is illustrated.

Each GPS satellite 12, 13, and 14 transmits a signal toward Earth 10 by means of an onboard antenna (not shown) which transmits the signal in a main lobe 12a, 13a, and 14a, respectively. The main lobes are strong enough to be received by geosynchronous satellite 16 but, because the main lobes are directional and only cover a conical area approximately 21 degrees in diameter, geosynchronous satellite 16 (in this example) is not in a position to intercept the main lobes 13a and 14a of GPS satellites 13 and 14. Main lobe 12a of GPS satellite 12 is partially shadowed or occluded (i.e. a fourteen degree cone 17) by Earth 10 (the main lobe being directed with the Earth positioned along the boresight of the main lobe) so that only the difference between a fourteen degree cone 17 and the twenty one degree main lobe 12a, i.e. a seven degree annulus 18, is visible at geosynchronous orbit 15. In the specific example illustrated in FIG. 1, geosynchronous satellite 16 is instantaneously within the seven degree annulus 18 and, thus, will receive the GPS signal from main lobe 12a of GPS satellite 12.

Figure 2:
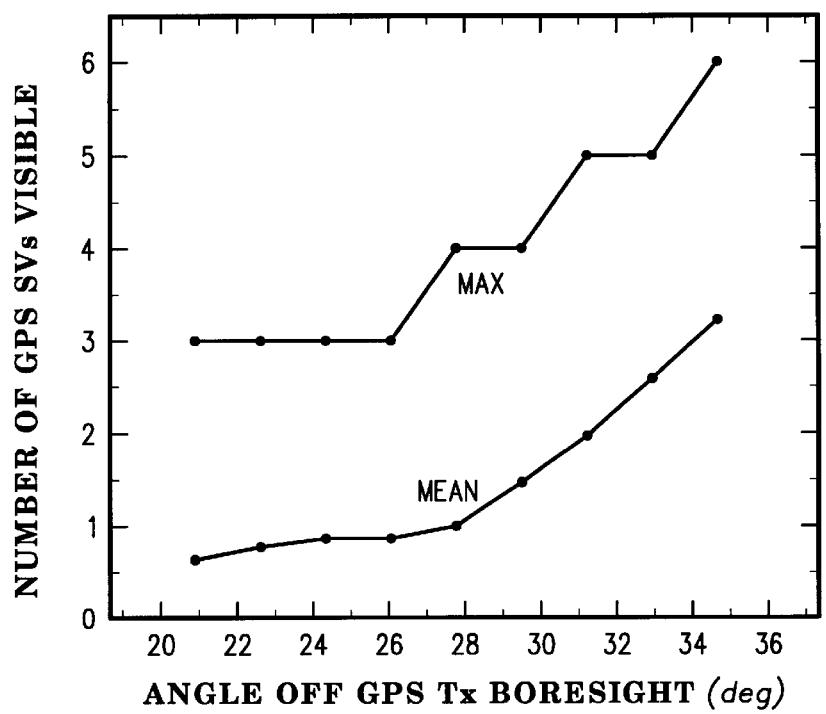
FIG. 2 is a graph illustrating GPS visibility at or near geosynchronous orbit.

Because the main lobe of each GPS satellite is directed with the Earth along the boresight which produces a fourteen degree conical Earth shadow in the main lobe, the number of GPS satellites visible to geosynchronous satellites at any instant in time is very small. Referring to FIG. 2, a graphical representation of the number of GPS satellites visible to geosynchronous satellites is illustrated. In the graph the vertical axis represents the number of GPS satellites and the horizontal axis represents the angle of the geosynchronous satellite off the boresight of a GPS satellite. The main lobe of each GPS antenna generally extends to a twenty one degree angle from the boresight. Thus, in geosynchronous satellites which are designed to receive the main lobe of a GPS satellite a mean number of GPS satellites which are visible at any instant in time is less than one and a maximum number is three. Therefore, it is clear that the use of the main lobe of GPS satellites for determining the position of satellites in or near geosynchronous orbits is not reliable.

Turning again to FIG. 1, the antenna of each GPS satellite 12, 13, and 14 also has a side lobe 12b, 13b, and 14d surrounding the main lobe. The side lobes extend the transmission angle to between thirty and thirty five degrees from the boresight. As can be seen from FIG. 2, extending the angle of visibility to thirty or thirty five degrees, increases the number of visible GPS satellites greatly. The problem is that the side lobes of the GPS satellites are buried deep in noise and cannot be received by prior art receivers used on geosynchronous satellites. Thus, prior art receivers are limited to the reception of main lobe signals from GPS satellites.

Figure 3:
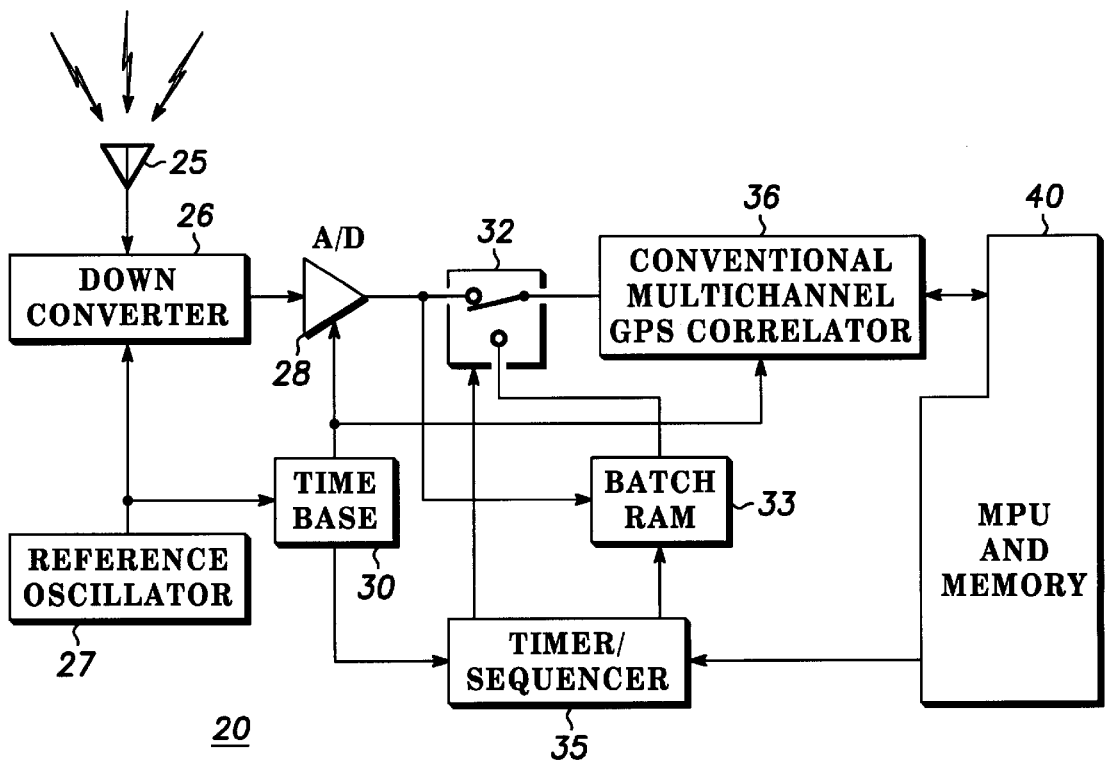
FIG. 3 is a simplified block diagram of a GPS receiver in accordance with the present invention.

Turning now to FIG. 3 a simplified block diagram is illustrated of a GPS receiver 20 in accordance with the present invention. The block diagram of FIG. 3 is simplified in that it illustrates only the basic steps or hardware used in the present invention. More complete discussions of GPS receivers can be found in three patent applications: a first entitled "AUTONOMOUS DATA-AIDED GPS SIGNAL ACQ METHOD AND SYSTEM", filed Feb. 19, 1999 and bearing Ser. No. APO1800; a second entitled "FIXED SITE DATA-AIDED GPS SIGNAL ACQUISITION METHOD AND SYSTEM", filed Feb. 19, 1999 and bearing serial No. APO1840; and a third entitled "FIXED SITE AND SATELLITE DATA-AIDED GPS SIGNAL ACQ METHOD AND SYSTEM", filed Feb. 19, 1999 and bearing Ser. No. APO1858, incorporated herein by reference.

Figure 4:
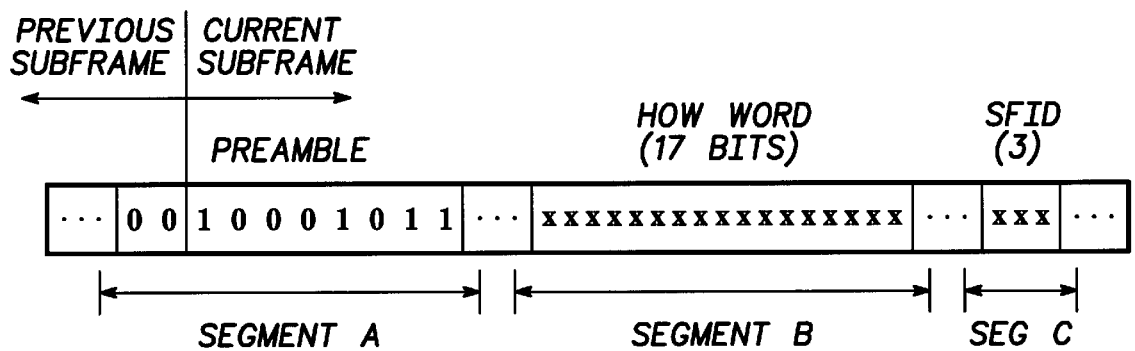
FIG. 4 illustrates a typical GPS data signal.

A receiver 20 is operatively included in each near geosynchronous satellite, with geosynchronous satellite 16 of FIG. 1 being used as an example in this discussion. Also, each geosynchronous satellite has a ground based spacecraft control center located beneath it on the Earth's surface, for example station 21 in FIG. 1, which is in constant direct communication with the associated geosynchronous satellite (e.g. satellite 16). In this specific embodiment, a pseudolite, which is herein defined as an Earth mounted GPS transceiver, is included in station 21 and continuously transmits GPS signals (an example of which is illustrated in FIG. 4) to geosynchronous satellite 16.

Referring specifically to FIG. 3, receiver 20 includes an antenna 25 which has incident thereon three types of GPS signals: a direct signal from the pseudolite in station 21 (hereinafter referred to as pseudolite signal 22); signals transmitted through the main lobe of GPS satellite antennas (e.g. main lobe 12a of GPS satellite 12); and signals transmitted through the side lobes of GPS satellite antennas (e.g. side lobes 13b and 14b of GPS satellites 13 and 14). As explained above, conventional spaceborne GPS receivers only track the signals transmitted through the GPS antenna main lobes, the side lobe signals being buried in noise and the pseudolite signals not being present, thus constraining visibility and navigation performance.

Antenna 25 is connected to a down converter 26 which also receives signals from a reference oscillator 27 for performing the down conversion. Signals from down converter 26 are supplied to an analog-to-digital (A/D) converter 28. Signals from reference oscillator 27 are supplied to a time base block 30 which supplies appropriate clock signals to the remainder of receiver 20. Digital signals are clocked out of converter 28 and into a switch 32 and a batch random access memory (RAM) 33. For convenience in understanding, switch 32 is illustrated as a simple single-pole double-throw mechanical switch, but it will be understood by those skilled in the art that switch 32 will generally be a high speed electronic switch integrated into the present receiver structure.

The digital signals from converter 32 are applied to one contact of switch 32 and signals from RAM 33 are applied to a second contact. The single pole of switch 32 is engaged with either the first contact or the second contact, depending upon signals supplied to switch 32 from a timer/sequencer 35. Also, the single pole of switch 32 is connected to supply signals to a conventional multi-channel GPS correlator 36. Typically, correlator 36 (and, thus, receiver 20) includes twelve or more channels, each of which is used to track or process a separate received signal. Correlator 36 is coupled to a Microprocessor Unit (MPU) 40 and an associated memory. MPU 40 is connected to control correlator 36 in a normal sequence. Also, MPU 40 is connected to control timer/sequencer 35, which controls the operation of switch 32 and RAM 33.

In this specific embodiment, one channel of correlator 36 is used to track pseudolite signal 22, which is identified by its unique ID and pseudo-random code. Pseudolite signal 22, for which continuous tracking is maintained, provides a highly accurate GPS time reference within receiver 20 which, as will be explained presently, is used for processing side lobe signals. Pseudolite signal 22 also assists in navigation, especially in light of the fact that Selective Availability (SA), the dominant GPS error source, is not imposed on pseudolite signal 22. The location on the Earth of the pseudolite (station 21) is known virtually without error. Pseudolite based pseudo range is therefore accurate to 5–10 meters and pseudolite derived Doppler is accurate to 2–5 cm/sec.

The remaining channels of receiver 20 or correlator 36 are allocated first to all GPS satellites for which main lobe signals are available. Here it will be understood by those skilled in the art that receiver 20 carries an almanac in memory and MPU 40 is capable of predicting the estimated positions for all GPS satellites. The signal processing for channels dedicated to main lobe GPS signals is performed as in a conventional GPS receiver, i.e. through down converter 26, A/D converter 28, switch 32, and correlator 36. The remaining channels, generally eight to ten channels, are used to acquire side lobe signals, the presence of which are again predicted by receiver 20 using the almanac for the GPS satellites, which is continuously available to receiver 20 through the pseudolite signal. For purposes of the following discussion a single side lobe signal will be used, but it will be understood that as many as five or six side lobe signals may be processed simultaneously in the various channels of receiver 20.

Referring again to FIG. 3, switch 32 switches between the conventional tracking of main lobe GPS signals from A/D converter 28 and data stored in RAM 33 Once the data segments are collected and stored in RAM 33, a dedicated fast correlator/processor performs a correlation. Using the known preamble bit sequence, the correlation is performed over several code delays, resulting in prompt and Early minus Late (E/L) code correlator outputs as a function of code delay. For the code correlator, the zero crossing represents the estimated pseudo range, but is relatively flat at the zero crossing. Alternatively, the peak of the prompt correlation can be used to derive the pseudo range. Use of the prompt data produces a pseudo range which is more accurate than one which is derived using the code correlation output for one data sample. Because of this difference in output accuracy, both prompt and code correlations are computed in this preferred embodiment. The derived side lobe based pseudo range is then combined with the more conventionally derived pseudo range and the pseudolite pseudo range in generating the navigation solution. In addition, signal Doppler information, available from conventional processing of the pseudolite and main lobe signals, can also be derived for the side lobe signals and used to compute the spacecraft velocity.

An alternative to tracking pseudolite signal 22 is to upload range observations made at ground station 21 using the TT&C link from station 21 to geosynchronous satellite 16. The TT&C range observations are processed in a filter (MPU 40) together with the GPS range measurements and provide time reference and measurement continuity equivalent to that from the pseudolite. The advantage of this approach is that it uses the existing TT&C line and avoids issues involved with radiating a GPS-like signal up to the geosynchronous satellites. The disadvantage is that the transponder and ranging equipment used in making the TT&C observations have time delays and the filter will have to account for an additional time base.

Figure 5:
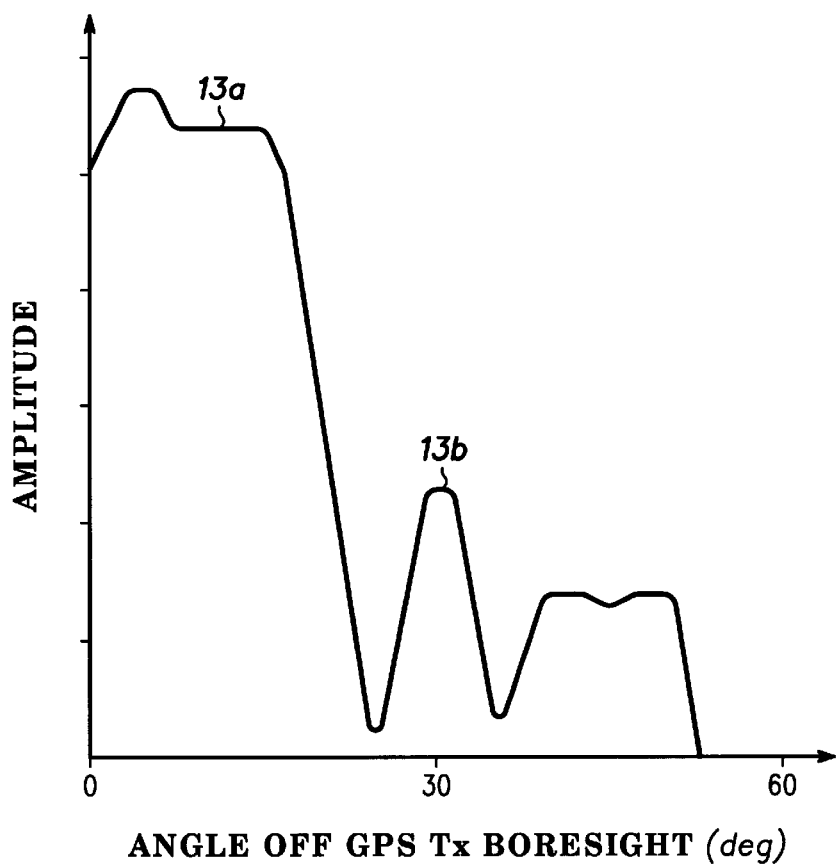
FIG. 5 illustrates a graphical representation of a typical GPS satellite antenna pattern.

Referring additionally to FIG. 5, a graphical representation of a typical GPS antenna pattern is illustrated. Antenna patterns for the antennas of GPS satellites exhibit significant variations across the GPS satellite constellation, but the general trend of the patterns indicates that a null, roughly 28–38 dB below the center value of the main beam (13a), exists about 25 degrees off the antenna boresight, and that a second, reduced peak (13b) occurs about 30 degrees off the boresight. For continuity with FIG. 1, the main lobe is designated 13a and the side lobe is designated 13b in this explanation. Side lobe 13b is roughly 11–22 dB below the center value of main lobe 13a. Thus, by extending the threshold of the GPS receivers (e.g. receiver 20) by 20 dB or more, the receivers will be able to acquire side lobe signals and will dramatically improve GPS visibility.

Receiver 20 of FIG. 3 enables the derivation of GPS pseudo range information at extremely low signal to noise ratios, up to 24 dB below normal thresholds. Generally, the reduced thresholds are achieved through a data aiding technique. For additional information, all of which is incorporated herein by reference, refer to the three patent applications cited above. Essentially, the technique relies upon knowledge of the sequence of 50 Hz navigation data bits (see the typical GPS signal illustrated in FIG. 4) to extend the Pre-Detection Interval (PDI) within the GPS receiver and allow greater noise averaging (integration of the received signal). Knowledge of the bit sequence permits the PDI to be longer than the normally maximum length of 20 msec (i.e., one bit period) during track. Extending the PDI, for example, to 200 msecs or ten data bits allows for a 24 dB gain in signal acquisition relative to a 1 msec PDI, or a 10 dB gain in signal tracking relative to a 20 msec PDI. Receiver 20 does not continuously track GPS side lobe signals, but stores time sequences of IF data, at least as long as the intended maximum PDI and then processes these time series in delayed real time to derive pseudo range information.

The IF data periods are selected to correspond to time intervals for which the navigation data bits are predictable, (e.g. the preamble or HOW words in the GPS signal illustrated in FIG. 4). The preamble is fixed across all GPS satellites, and each 10 bit word occurs every six seconds, while the HOW word is 17 bits and increments by one count every six seconds for all satellites. Although the data bit sequences are synchronized to GPS time, variations in range delays to the user, coupled with individual satellite clock errors, produce variations which reach tens of msecs for a geosynchronous satellite. The selected data bit sequence length (predictable data) must accommodate this uncertainty. Storage of the requisite IF data costs significant memory and it is estimated that 128K bytes of RAM is required for a 250 msec interval. If, for example, the preamble sequence which is 200 msecs long is selected for data aiding, a maximum of 50 msecs tolerance for variations in range delay and GPS tracking error remains.

There are several limitations to the use of the data aided technology in space, most notable of which is the implications on knowledge of GPS time and signal Doppler. In order to collect the appropriate segments of IF data (e.g. including the preamble bits for each satellite), GPS time must be known to the msec level. The exact level is the difference between the largest variation in range delay plus satellite clock error and the 50 msec margin in the IF sample length explained above. In the preferred embodiment, the time accuracy problem is solved by introducing a GPS pseudolite, e.g., the pseudolite at ground station 21 for geosynchronous satellite 16. GPS pseudolite signal 22 provides a stable time reference for receiver 20 Further, pseudolite signal 22 is always visible to geosynchronous satellite 16 and is tracked as a normal GPS signal by receiver 20.

In addition to the requirement for sufficiently accurate time, fairly precise Doppler information is required to extract meaningful correlation data from the side lobe signals. For segments which are 200 msecs long (e.g. the preamble), Doppler should be known to within a few Hz. Without prior information on signal Doppler, searching with Doppler bins only 5 Hz wide would make signal detection highly unlikely at geosynchronous altitude, where large Doppler uncertainties (i.e. several kHz) are expected. Here again the problem is solved by using the range information derived from GPS pseudolite signal 22. This range information is more accurate than range information derivable from the GPS satellite signals, since it is not intentionally contaminated by Selective Availability (SA).

Thus, a new and novel method and apparatus for determining the position of a satellite in a near synchronous orbit is disclosed. The new method and apparatus includes using the side lobe signals from GPS antennas, which side lobe signals were previously either unacquirable or completely impractical because of the time required to acquire the signals. In the present novel method and apparatus, a known sequence of data bits (e.g. the GPS preamble or HOW words) is used along with GPS time and Doppler signals obtained from the Earth (e.g. using a pseudolite positioned at the ground control center or TT&C ground links). Using the time and Doppler signals correlation is achieved between the known sequence and the GPS signal received from a side lobe. In this method, the side lobe signal can be used in conjunction with main lobe signals (processed in a normal fashion) to obtain position and or navigation information. By using side lobes of the GPS antennas, the entire positioning system is reliable and constant, because many more GPS satellites are visible at any time.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A method of determining the position of a satellite in a near geosynchronous orbit comprising the steps of:

receiving a main lobe signal from an antenna on a first GPS satellite;

providing a plurality of known sequential data bits for a GPS signal;

providing GPS time and Doppler information;

acquiring side lobe signals from antennas on second GPS satellites using the known sequential data bits and the GPS time and Doppler information; and determining the position of the satellite in a near geosynchronous orbit using the main lobe signal and the side lobe signals.

2. A method of determining the position of a satellite in a near geosynchronous orbit as claimed in claim 1 wherein the step of providing GPS time and Doppler information includes receiving the GPS time and Doppler information from a pseudolite positioned on the Earth and the step of receiving side lobe signals includes using the known data bits and the GPS time and Doppler information for sorting the side lobe signals from accompanying noise signals.

3. A method of determining the position of a satellite in a near geosynchronous orbit as claimed in claim 2 wherein the step of sorting the side lobe signals from accompanying noise signals includes integrating the received side lobe signal over a period of time greater than one data bit of the side lobe signal.

4. A method of determining the position of a satellite in a near geosynchronous orbit as claimed in claim 3 wherein the period of time greater than one data bit is achieved by using the GPS time and Doppler signals to correlate the known data bits with received data bits in each received side lobe signal.

5. A method of determining the position of a satellite in a near geosynchronous orbit as claimed in claim 4 wherein the step of integrating the received side lobe signal over a period of time greater than one data bit of the side lobe signal includes integrating the received side lobe signal until the accompanying noise averages out and the side lobe signal is identifiable.

6. A method of determining the position of a satellite in a near geosynchronous orbit as claimed in claim 1 wherein the step of providing GPS time and Doppler information includes receiving time reference and range measurements from a ground station.

7. A method of determining the position of a satellite in a near geosynchronous orbit as claimed in claim 1 wherein the step of providing known data bits includes selecting common data bits in all GPS signals.

8. A method of determining the position of a satellite in a near geosynchronous orbit as claimed in claim 1 wherein the step of providing known data bits includes using one of a preamble and a HOW word in the GPS signal.

9. A method of determining the position of a satellite in a near geosynchronous orbit as claimed in claim 1 wherein the step of acquiring side lobe signals includes a step of determining an approximate position of each of the second GPS satellites from an onboard almanac.

10. A method of determining the position of a satellite in a near geosynchronous orbit comprising the steps of:

receiving at least one main lobe signal from an antenna on a first GPS satellite;

receiving a GPS signal from a pseudolite positioned on the Earth;

providing a plurality of known data bits for a GPS receiver;

determining an approximate position of each of a plurality of second GPS satellites from an onboard almanac;

receiving side lobe signals and accompanying noise from antennas on the plurality of second GPS satellites;

using the known data bits and the GPS signal, sorting the side lobe signals from the accompanying noise;

determining the position of the satellite in a near geosynchronous orbit using the at least one main lobe signal and the side lobe signals; and the step of sorting the side lobe signals from accompanying noise includes integrating each of the received side lobe signals and accompanying noise over a period of time approximately equal to the known data bits of the GPS signal.

11. A method of determining the position of a satellite in a near geosynchronous orbit as claimed in claim 10 wherein the step of receiving the GPS signal includes determining GPS time and Doppler from the received GPS signals.

12. A method of determining the position of a satellite in a near geosynchronous orbit as claimed in claim 10 wherein the step of providing the plurality of known data bits includes selecting common data bits in all GPS signals.

13. A method of determining the position of a satellite in a near geosynchronous orbit as claimed in claim 12 wherein the step of providing the plurality of known data bits includes using one of a preamble and a HOW word in the GPS signals.

* * * * *